United States Patent [19]
Duncan et al.

[11] 3,887,873
[45] June 3, 1975

[54] PULSE AMPLITUDE MODULATION, FREQUENCY MODULATION TELEMETRIC DATA TRANSMITTER

[75] Inventors: Jerry E. Duncan; Lance E. Riggin, both of Indianapolis, Ind.

[73] Assignee: The United States of America as represented by the Secretary of the Navy, Washington, D.C.

[22] Filed: July 8, 1971

[21] Appl. No.: 163,531

[52] U.S. Cl. ............ 325/113; 325/185; 179/15 BL; 340/180; 340/203; 343/203
[51] Int. Cl. ............................................. H04b 1/04
[58] Field of Search ......... 325/113, 3, 13, 141, 185; 340/180, 209, 203; 343/200, 203; 179/15 BL

[56] References Cited

UNITED STATES PATENTS 3,684,962 8/1972 Hottel, Jr. ........................... 325/113

*Primary Examiner*—Maynard R. Wilbur
*Assistant Examiner*—H. A. Birmiel
*Attorney, Agent, or Firm*—R. S. Sciascia; Paul S. Collignon

[57] ABSTRACT

A data signal telemetry system having a pulse amplitude modulation subsystem, a video doppler subsystem, and a switchable external and internal power subsystem coupled and coacting to produce a composite signal of a plurality of information bits and a video signal of a target object or objects for transmission to remote points.

8 Claims, 8 Drawing Figures

INVENTORS:
JERRY E. DUNCAN
LANCE E. RIGGIN
BY H. H. Losche

INVENTORS:
JERRY E. DUNCAN
LANCE E. RIGGIN
BY H. H. Losche

INVENTORS:
JERRY E. DUNCAN
LANCE E. RIGGIN
BY *W. H. Losche*

PULSE AMPLITUDE MODULATION, FREQUENCY MODULATION TELEMETRIC DATA TRANSMITTER

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

This invention relates to data telemetering transmission systems and more particularly to such a system having three subsections to receive amplitude and frequency modulated signals that are processed to produce a composite signal in a condition for transmitting to remote points telemetric data and target information.

In the known telemetering devices target data from a missile in flight is usually coded in pulse or digital code signals, Morse code, or by television for transmission to a remote station, as a ground or airborne station to evaluate the information.

SUMMARY OF THE INVENTION

In the present invention a pulse amplitude modulation (PAM) subsystem receives the signals in signal conditioners to provide signals of uniform amplitude. These uniform signals are applied through a rate matrix to a solid state commutator of field effect transistor gates which are gated by a clock frequency and sequence counter to place a plurality of bit signals over a single output. A video doppler signal of the target in a wide range of frequency and amplitude is amplitude compressed to a uniform amplitude and translated into a frequency which can be kept distinct from the PAM signals. These PAM and video doppler signals are mixed in a mixing amplifier and conducted to the transmitter for transmission to remote points. A power subsection has switching means therein to switch an external voltage source to the above disclosed equipment in the missile for ground test and operation and to switch to internal batteries for missile travel operation. Missile target information is transmitted to the remote points to evaluate target position and kill. It is accordingly, a general object of this invention to provide a single transmission channel to transmit video doppler radar signals of the missile and target relation and of the missile operational signals for transmission to remote points for evaluation of missile operation.

BRIEF DESCRIPTION OF THE DRAWINGS

These and other objects and the attendant advantages, features and uses of the invention will become more apparent to those skilled in the art as a more detailed description proceeds when considered along with the accompanying drawings, in which.

DESCRIPTION OF THE PREFERRED EMBODIMENT

Figure 1:
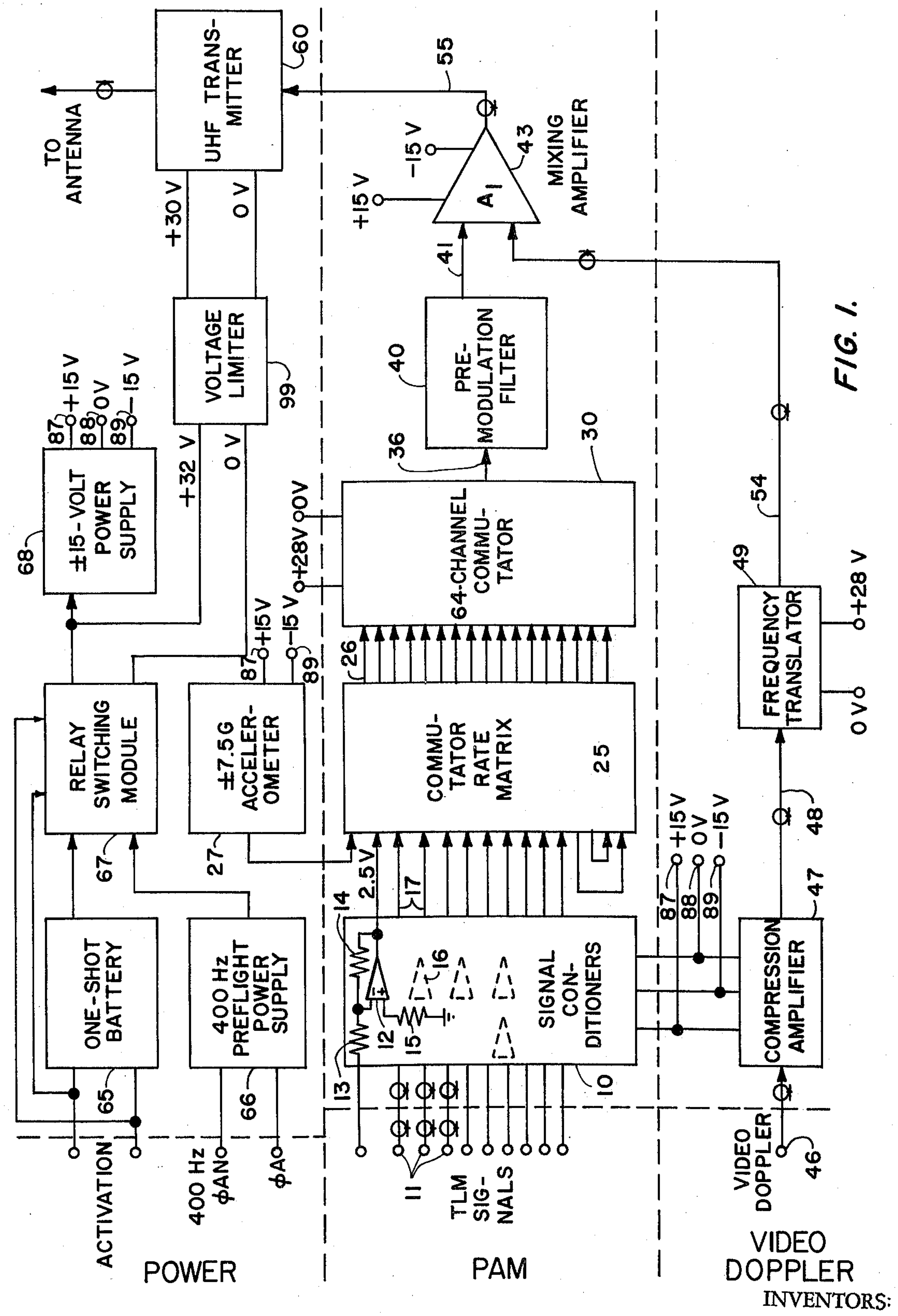
FIG. 1 is a block circuit schematic of the three circuit subsections constituting the telemetry insert.

Referring more particularly to FIG. 1 with occasional reference to the other FIGS. 2 through 8 as appropriate in the description herein, like reference characters being used for like parts throughout in which are illustrated the PAM subsection, video doppler subsection, and power subsection of a telemetry insert as used in telemetering missile control information and pulse doppler radar information from a missile in flight to its target object.

Figure 2:
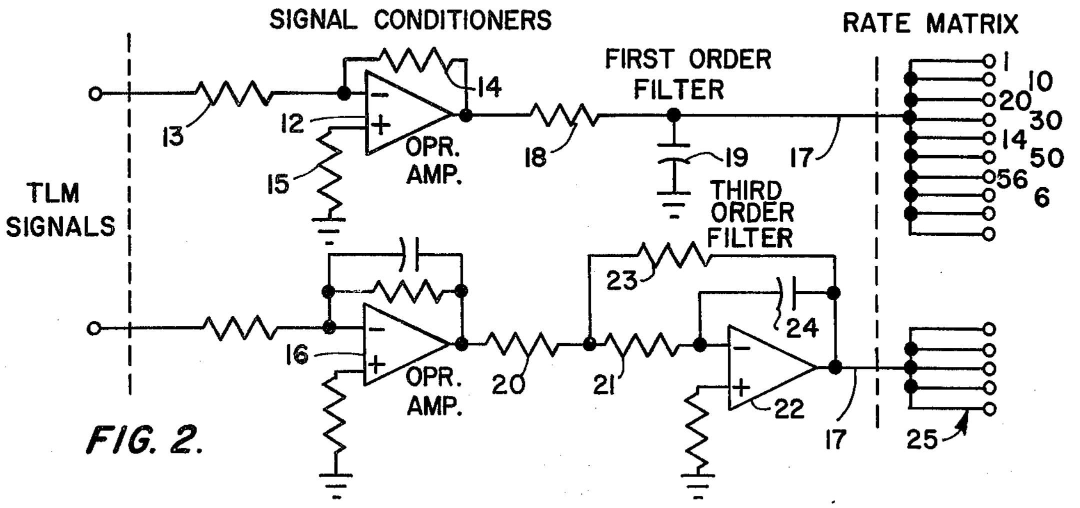
FIG. 2 is a circuit schematic partially in block of the signal conditioners and rate matrix shown in block in FIG. 1.

The PAM subsection illustrates a block of signal conditioners 10 with input taps 11 thereto adapted to receive telemetry signals from a missile, such as missile tail position, missile head position, steering gate, gyro position, homing error, etc., being information as to missile function. The block of signal conditioners 10 consist of a plurality of operational amplifiers such as 12 and 16, one each coupled to one each channel input 11 with like channel outputs 17 therefrom. Each operational amplifier such as 12 has its channel input from the telemetering (TLM) signal through a resistor 13 to the negative terminal of the operational amplifier. Each amplifier has a feedback path through a resistor illustrated as 14 herein. The positive input terminal of the operational amplifier is through a biasing resistor 15 to a fixed potential, such as ground. The operational amplifier circuits are more particularly illustrated in FIG. 2 showing an output filter for each operational amplifier which filters may be first order, second order, or third order filters. For the purpose of example of operation herein the operational amplifier 12 is shown with a first order filter consisting of a resistor 18 and a capacitor 19 between the operational amplifier 12 and the signal conditioner output 17. By way of example the operational amplifier 16 has its output coupled through resistors 20 and 21 in series to the negative input of an amplifier 22 which has one feedback through a resistor 23 to the terminal junction of resistors 20 and 21 and a capacitor feedback 24 to the negative input terminal. The signal conditioners consisting of the operational amplifier circuits and related filter circuits are active circuits in which all TLM signals are made uniform in both polarity directions regardless of the amplitude and polarity of the input TLM signals. As one example of operation, the output of each operational amplifier may be limited to ±2.5 volts although the input TLM signals normally would exceed this voltage amplitude in either polarity since the TLM signals may be in the range of 5 to 150 kilocycles (Kc) at random voltage amplitudes. The filters are passive devices to filter the TLM signals in accordance with the frequency characteristics of the sending element. Most of the filters required are the simple RC networks but the frequency characteristics of other sending elements require second order and third order filter circuits to adapt these TLM signals for the rate matrix and the channel commutator.

Each channel output of the signal conditioners is conducted over the output conductor 17 to the rate matrix 25 which is also a passive device that selects input channels of the commutator on which the missile function appears. The more channels a signal appears on, the more times per second that function is sampled. This process of sampling a function more than once per frame of commutation is known as super commutation. This process is necessary for TLM signals that are changing at a rate such that information would be lost by too great a time lapse between samples. Accordingly, by way of example the first single conductor output is shown in FIG. 2 as being conducted to every tenth channel input to the commutator while the lower signal conditioner output channel is shown coupled to five input channels to the commutator from the rate matrix 25.

Figures 3, 4:
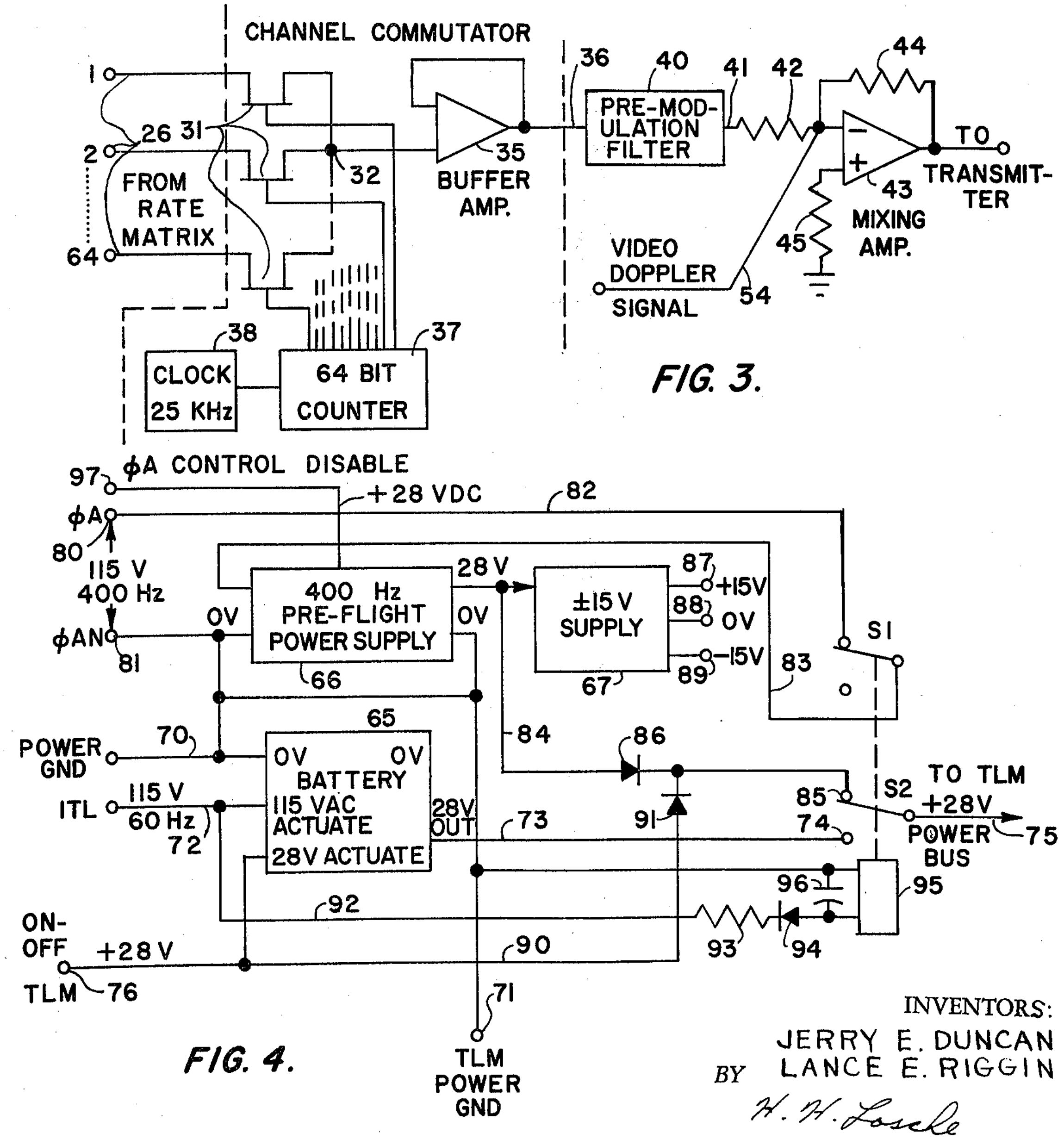
FIG. 3 illustrates in partially circuit schematic and partially block diagram of the channel commutator, premodulation filter and mixing amplifier more broadly shown in block in FIG. 1.
FIG. 4 shows in partially circuit schematic and partially block diagram the power supply subsection shown in FIG. 1.

Referring more particularly to the block 30 in FIG. 1 and the schematic thereof in FIG. 3, the inputs 26 channeled from the rate matrix 25 are channeled into the commutator 30 which can handle up to 64 channels although this channel number may be increased or decreased to meet the demands of specific applications. Each channel input is coupled to one of the conduction terminals of an FET 31 and the opposite conduction terminals of all FETs 31 are coupled in common to a terminal point 32. This common output terminal 32 of FETs 31 is coupled through a buffer amplifier 35 to its output terminal 36. The input conductors 26 provide channels 1 through 59 of the 64 FETs 31, the gate terminals of each FET being coupled to one output terminal of a 64-bit sequence counting circuit 37 so that the channels 1 through 64 FETs 31 will be gated on sequentially 1 through 64 by the sequence counter 37. Two of the 59 inputs 26 are from an accelerometer 27. The sequence counter 37 is driven by a clock pulse source 38 which, for the purpose of example of operation herein, is shown to be a 25 Kc frequency. The rate at which the gates 31 are turned on is established by the clock signal. In the telemetry inserts with a clock frequency of 25 Kc the time for each channel is the reciprocal of 1/25,000 or 40 microseconds per channel. The buffer amplifier 35 provides impedance buffering and level shifting. In the inserts all signal levels are preconditioned to maximum levels of ± 2.5 volts and the buffer and the commutator 30 is a non-inverting voltage follower with a low output impedance.

The common output 36 from the buffer amplifier 35 and channel commutators is coupled as an input to a premodulation filter 40 which is a passive device to remove the high frequency components contained in the commutator output. Even though the commutator 30 is operating at a 25 Kc rate, the rise time between channels can be quite low thus generating high frequency components which, if allowed to reach the input of the transmitter, would produce modulation outside the assigned telemetry channel. The output of the premodulation filter is by way of conductor 41 through a resistor 42 to the negative input terminal of a mixing amplifier 43, the purpose of which will later be described. The mixing amplifier 43 has a feedback through a resistor 44 and has the positive input thereof biased to the fixed potential or ground through a resistor 45, as observed in FIG. 3.

Figure 5:
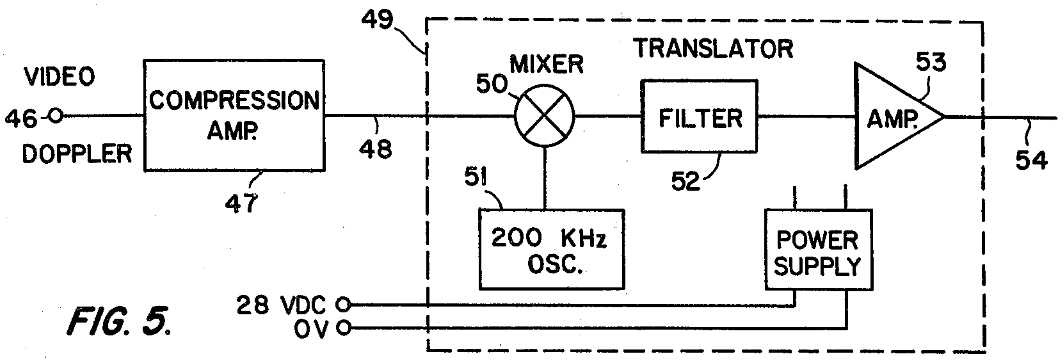
FIG. 5 illustrates in block circuit schematic a broken down block diagram of the video doppler subsection shown in FIG. 1.
Figure 6:
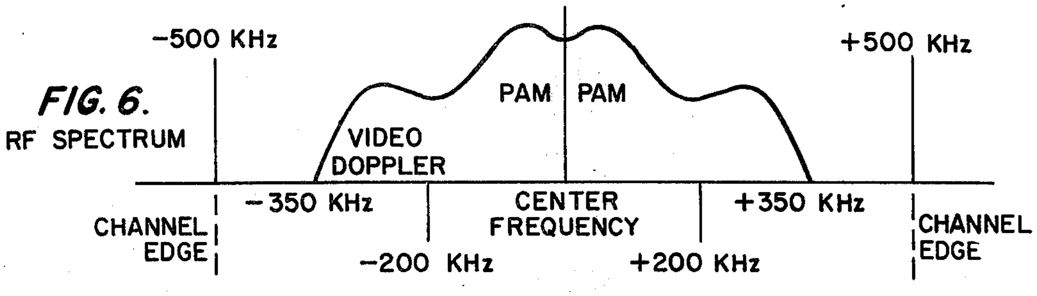
FIG. 6 illustrates a radio frequency (RF) spectrum of the PAM video doppler after mixing in the mixing amplifier.
Figure 7:
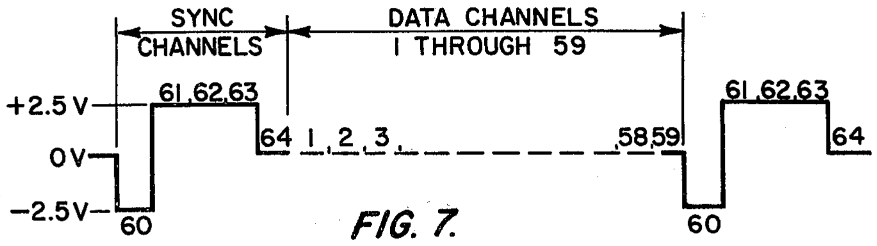
FIG. 7 illustrates in waveform the sync channels and data channels throughout the commutator capability of the system.
Figure 8:
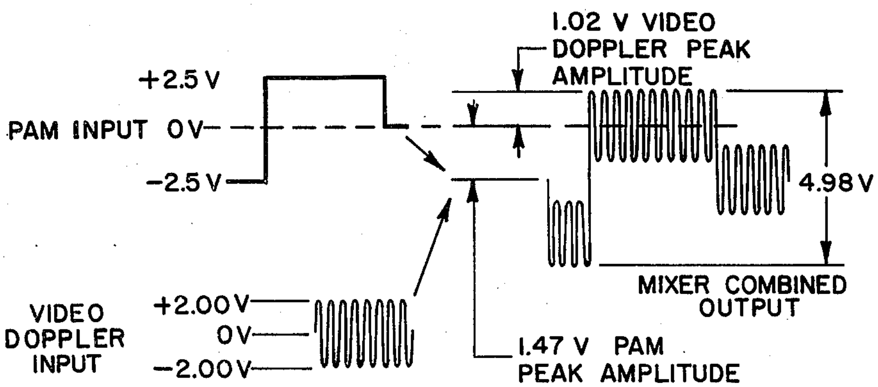
FIG. 8 illustrates in waveform the PAM and video doppler mixed inputs and the composite or combined output for transmission.

Referring more particularly again to FIG. 1 with occasional reference to FIG. 5, the video doppler subsection receives the radar video doppler frequency on an input tap 46 to a compression amplifier 47. The video doppler is a missile output which is a complex high frequency signal of varying amplitude. The output frequency has components over the frequency range of 5 to 150 Kc. The high frequency components make it impossible to be sampled by the commutator 30 thus the channel for the video doppler signal must be a continuous signal processor. The amplitude of the video doppler signal can vary from about 0.4 millivolts to about 500 millivolts RMS which is processed in the compression amplifier 47 to produce on the output 48 thereof a constant amplitude variable frequency with the amplitude of the signals by ±4 volts, as one example of operation. The information in the video doppler signal is contained in the frequency of the signal rather than in its amplitude and, accordingly, the amplitude may be maintained within upper and lower limits as hereinbefore stated. Since the frequency range of the video doppler signal is from 5 to 150 Kc it cannot be summed with the PAM-TLM signals in the mixing amplifier 43 directly because the frequency component by both signals will overlap. This problem is eliminated by shifting the frequency spectrum of the video doppler signal up above the highest component in the PAM signal. This shifting in frequencies is accomplished by the frequency translater 49 shown in block in FIG. 1 and in partial circuit schematic in FIG. 5. The input signal from 48 is first mixed in a balanced modulator mixer 50 with a 200 Kc frequency from an oscillator 51. As in all mixers the sum and difference frequencies are then generated. The output of the mixer 50 is coupled through a filter 52 which attenuates the difference signals but passes the sum signals. The sum signals are then amplified by an output amplifier 53 to pass the sum or higher order video doppler signals on the output 54 which is coupled as the second input to the mixing output amplifier 43, as shown in FIGS. 1 and 3.

The mixing amplifier 43 mixes the PAM frequency signals applied by way of conductor means 41 and the video doppler signal coming by way of the conductor means 54 to produce a composite or combined or mixed signal on the output conductor 55 which is coupled as an input to the UHF transmitter 60 which combined signal frequency modulates (FM) the transmitter to a frequency for transmission to remote receivers. As shown more specifically in FIG. 6, the RF spectrum transmits the PAM signals near the center frequency up to about ± 200 Kc whereas the video doppler RF signals are transmitted between −200 Kc to −350 Kc and +250 Kc to +350 Kc. As more particularly viewed in FIG. 7, the 60 data channels are illlustrated in waveform within the above described limits of ± 2.5 volts with channels 60 through 64 constituting the synchronizing channels and the channels 1 through 59 constituting the data channels used for transmitting the PAM signals. As more particularly shown in FIG. 8, the PAM input signals and the video doppler input signals are combined or mixed to produce the signals as shown to the right of this figure over a voltage span of 4.98 volts although this voltage span of 1.42 volt peak for the video doppler and 1.47 volt peak for the PAM signals are purely for the purpose of example and are not intended to be limited to the invention. Accordingly, the PAM-TLM signals and the video doppler signals can be commutated and mixed to be transmitted over a single UHF transmitter channel to remote receiver stations.

Referring more particularly to FIG. 1 and FIG. 4, the power supply subsystem includes a battery supply 65, a 400 cps pre-flight power supply 66, a relay switch module 67, and a ± 15 volt power supply 68 as an insert for the power supply of the PAM, video doppler, mixing amplifier, and transmitter of FIG. 1. Since all missile subsystems require both internal power and external power, this system requires means for switching such two or more power sources for ground and pre-flight service as well as in-flight service. The battery system 65 is coupled to a power ground conductor 70 which is also a TLM power ground as shown at terminal 71. Battery 65 in this illustration of operation may have an intent to launch (ITL) input terminal 72 of 115 volt 60 cycle to an actuate terminal of battery 65 which battery has a built-in reservoir of electrolite in a separate section of the battery which activated by the ITL will produce a 28 volt output on the output conductor 73 to the switch contact 74 of the relay switch S2. Whenever switch S2 is switched to contact 74 the 28 volt will be conducted over the output 75 to the TLM power bus. This reservoir of electrolite is activated by 115 volts ITL input to produce heat which activates a gas generator forcing the electrolite into the section of the battery with the plates to activate the 28 volt output on 73. A similar activation can be accomplished for the ON-OFF 28 volt input TLM at terminal 76 coupled to the 28 volt actuate input terminal of the battery 65. Battery 65 can be purchased as a commercial item and, by way of example, might be of the type designated as an automatically activated primary battery system and sold by Yardney Electric Corporation under the tradename SILVERCEL. This type of battery system is more fully described in an energy data book entitled, "Compact Power by Yardney", published in 1962 by the Yardney Electric Corporation, New York, N.Y.

An external power source identified by $\phi$A and $\phi$AN at terminals 80 and 81 providing 115 volt, 400 cps input is conducted by way of the conductor means 82 through the closed switch S1 contacts of the relay switch over the conductor means 83 as an inpupt to the 400 cps pre-flight power supply 66 to produce an output of 28 volts on the conductor 84 to the terminal 85 of relay switch S2 conducting the 28 volt source to the TLM power bus 75. This conductor 84 is through diode 86 to produce only positive voltage on the TLM conductor 75. The output 84 is also applied to the 15 volt supply 67 to produce ± 15 volt output which is wired as voltage supply to the compression amplifier and the accelerometer and other elements or components as needed by way of terminals 87, 88, and 89. The ON-OFF TLM, when applied to terminal 76, is also coupled by the conductor 90 through the diode 91 to supply only positive 28 volt voltage to the TLM power bus 75. The terminal 72 of the ITL input is coupled by way of a branch conductor 92 through a resistor 93 and a diode 94 to the electromagnetic coil 95 of the relay switch S1,S2 to switch S1 and S2 to the lower contact positions to supply internal battery power to bus 75. A capacitor 96 is coupled across the leads of the electromagnetic coil 95 such that this capacitor will charge from a short pulse of ITL input current at 72 on the negative half cycles of the signal to latch the relay S1 and S2 in the lower contact positions. Accordingly, only a short pulse of ITL voltage at 72 is needed to activate battery 65 and lock relay switches S1,S2. Contact S1 of the relay breaks the $\phi$A, 400 cps input to the pre-flight power supply which must be done after launch to remove the power supply from the $\phi$A input which, during flight, is missile generated power. Contact S2 of the relay in the upper contact position connects the 28 volt terminal of the 400 cycle power supply 66 to power bus 75. At ambient temperature conditions, this entire process of battery activation and relay switching takes place in not more than one-half second. An input terminal 97, designated as $\phi$A control disable, is a +28 VDC used during launch test of the inserts PAM and video doppler, which activates an internal relay which opens the 400 cps input thus turning the supply off. This relay remains energized as long as the +28 volts is applied. As viewed in FIG. 1, the output of the relay switching module 67 applies voltage through a voltage limiter 99 to the UHF transmitter 60 to limit this voltage in an upper limit of 30 volts to avoid damage to the transmitter. Voltage to the limiter may be in the range of 28 to 32 volts. Accordingly, the missile components or subsections may be supplied external power when the missile is being tested or readied for flight and the battery or internal power source activated by the ITL signal to supply internal power so that the missile will have power from the power bus during its flight.

OPERATION

In the operation of the device of FIG. 1 let it be assumed that the power supply is switched for external power source, as shown by the relay switch S1 and S2 positioned as in FIG. 4, and that the missile is ready for flight. Battery 65 is activated by the application of an ITL pulse signal at 72 to switch the missile subsections to internal power. The missile is accordingly sent on its flight and immediately starts transmitting PAM signals and video doppler signals during its flight to a target, transmitting back or to remote stations within the transmitter range to be demodulated and evaluated indicating the various missile functions of rudder, heading, gyroscope operation, accelerometer indications, etc., as well as the closing rate on the target by the information transmitted from the video doppler subsection. Accordingly, ground or other receiving station personnel can follow the missile in its flight and its collision course with the target.

While many modifications and changes may be made in the constructional details and particularly in the various voltages applied or used, it is to be understood that we desire to be limited in the spirit of our invention only by the scope of the appended claims.

We claim:

1. A pulse amplitude modulation, frequency modulation telemetric data transmission system comprising:

a pulse amplitude modulation telemetry signal subsection having signal conditioners to receive channeled telemetry signals and unify the amplitudes thereof, a commutation rate matrix coupled to said signal conditioners to receive said uniform signals and matrix them to appear on an appropriate number of channel outputs, a channel commutator of gates driven in sequence by a counter circuit that is driven by a clock pulse source with each gate coupled to a channel output of said matrix through said gate to a common output, and a premodulation filter coupled in said common output;

a video doppler subsection having a compression amplifier to receive video doppler frequency signals of random amplitude to compress said signals to a uniform amplitude on an output thereof, and a frequency translator coupled to the compression amplifier output to translate said frequency signals to corresponding levels different from the frequency levels of said telemetry signals on an output thereof;

a transmitter for transmitting radio frequency signals;

a summing amplifier coupled to said common output of said premodulation filter and the output of said frequency translator and having an output coupled to said transmitter to sum said telemetry signals and said video doppler signals into composite signals for transmission; and a power supply subsection having batteries therein coupled through switches and conductors to said telemetry channel, said video doppler channel, said summing amplifier, and said transmitter to switch said conductors to external taps for external power supply under one condition and to switch said conductors to said batteries under another condition whereby telemetry signals of missile operation and video signals of a target object with respect to said missile are transmitted over a single radio channel.

2. A data transmission system as set forth in claim 1 wherein said signal conditioners includes an operational amplifier and a filter in series coupled to each telemetry signal input channel to limit the output signal in amplitude in the positive and negative polarity directions.

3. A data transmission system as set forth in claim 2 wherein said channel commutator of gates includes a field effect transistor for each telemetry signal with the outputs of all field effect transistor gates being coupled in common to a buffer amplifier the output of which is to said premodulation filter, and said gate terminals of each field effect transistor is coupled respectively to one each counter channel output of said counter circuit to gate each field effect transistor in sequence.

4. A data transmission system as set forth in claim 3 wherein said frequency translator includes a mixer, an oscillator, a filter, and an amplifier with the outputs of said compression amplifier and said oscillator coupled as inputs to said mixer to produce sum and difference frequencies on an output thereof, said output being coupled through said filter and said amplifier to filter out said difference frequencies and to rebuild the amplitude of the summed frequencies to usable level on the output of said frequency translator.

5. A data transmission system as set forth in claim 4 wherein said power supply includes two relay switches of alternate switch contacts constituting said switches and includes an alternating current to direct current converter along with said battery, one relay switch coupling an external tap through said converter and through the second relay switch to the power supply output for one switched condition and said first relay switch being open in the alternate switched condition, and said second relay switch coupling said battery to the power supply output in said alternate switched condition.

6. A data transmission system as set forth in claim 5 wherein said conductors to said second relay switch in said one switched condition are through diodes oriented to provide positive polarity direct current voltage to said power supply output.

7. A data transmission system as set forth in claim 6 wherein said filter coupled in series with said operational amplifier is selectively a first order, second order, and a third order filter as required for the telemetry signal conducted through the channel.

8. A data transmission system as set forth in claim 7 wherein said commutator gates consist of 64 and said counter produces a consecutive count to 64, five gating channels being for synchronization signals and the remainder for telemetry data signals.

* * * * *